US012659455B2

(12) United States Patent
Philippe et al.

(10) Patent No.: US 12,659,455 B2
(45) Date of Patent: Jun. 16, 2026

(54) WEIGHTED IMAGE PREDICTION, IMAGE CODING AND DECODING USING SUCH A WEIGHTED PREDICTION

(71) Applicant: ORANGE, Issy-les-Moulineaux (FR)

(72) Inventors: Pierrick Philippe, Chatillon (FR); Théo Ladune, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 244 days.

(21) Appl. No.: 18/546,854

(22) PCT Filed: Feb. 15, 2022

(86) PCT No.: PCT/FR2022/050272
§ 371 (c)(1),
(2) Date: Aug. 17, 2023

(87) PCT Pub. No.: WO2022/175625
PCT Pub. Date: Aug. 25, 2022

(65) Prior Publication Data
US 2024/0073411 A1 Feb. 29, 2024

(30) Foreign Application Priority Data

Feb. 19, 2021 (FR) ...................................... 2101632

(51) Int. Cl.
*H04N 19/105* (2014.01)
*H04N 19/137* (2014.01)
(Continued)

(52) U.S. Cl.
CPC ......... *H04N 19/105* (2014.11); *H04N 19/137* (2014.11); *H04N 19/182* (2014.11);
(Continued)

(58) Field of Classification Search
CPC .. H04N 19/105; H04N 19/137; H04N 19/182; H04N 19/436
See application file for complete search history.

(56) References Cited

U.S. PATENT DOCUMENTS

| | | | |
|---|---|---|---|
| 2019/0230350 A1* | 7/2019 | Chen ................... | H04N 19/573 |
| 2020/0356827 A1 | 11/2020 | Dinerstein et al. | |
| 2021/0120247 A1* | 4/2021 | Galpin ..................... | G06N 3/02 |

FOREIGN PATENT DOCUMENTS

| | | |
|---|---|---|
| EP | 3668097 A1 | 6/2020 |
| WO | 2006128072 A2 | 11/2006 |

OTHER PUBLICATIONS

English translation of the Written Opinion of the International Searching Authority dated Jun. 3, 2022 for corresponding International Application No. PCT/FR2022/050272, filed Feb. 15, 2022.
(Continued)

*Primary Examiner* — Kathleen V Nguyen
(74) *Attorney, Agent, or Firm* — David D. Brush; Westman, Champlin & Koehler, P.A.

(57) ABSTRACT

A method for predicting at least one set of current pixels, implemented by a prediction device, in which at least one set of current pixels is predicted on the basis of at least one set of reference pixels, with the assistance of a pixel prediction weighting function. The pixel prediction weighting function of the at least one set of current pixels is associated with at least one weighting value calculated on the basis of an analysis of at least one set of reference pixels.

20 Claims, 9 Drawing Sheets

(51) Int. Cl.

| | |
|---|---|
| *H04N 19/182* | (2014.01) |
| *H04N 19/436* | (2014.01) |
| *H04N 19/463* | (2014.01) |
| *H04N 19/577* | (2014.01) |

(52) U.S. Cl.
CPC ......... *H04N 19/436* (2014.11); *H04N 19/463* (2014.11); *H04N 19/577* (2014.11)

(56) References Cited

OTHER PUBLICATIONS

Wei Hong, "Low-Complexity Occlusion Handling for Motion-Compensated Frame Rate Up-Conversion" Consumer Electronics, 2009, ICCW '09, Digest of Technical Papers International Conference on, IEEE, Piscataway, NJ, USA, Jan. 10, 2009 (Jan. 10, 2009), pp. 1-2, XP31466904.

Ravi Krishnamurthy et al., "Frame Interpolation and Bidirectional Prediction of Video Using Compactly Encoded Optical-Flow Fields and Label Fields", IEEE Transactions on Circuits and Systems for Video Technology, Institute of Electrical and Electronics Engineers, US, vol. 9, No. 5, Aug. 1, 1999 (Aug. 1, 1999), XP11014592.

Zhao Zhenghui et al., "Enhanced Bi-Prediction With Convolutional Neural Network for High Efficiency Video Coding", IEEE Transactions on Circuits and Systems for Video Technology, Institut of Electrical and Electronics Engineers, US, vol. 29, No. 11, Nov. 1, 2019 (Nov. 1, 2019), pp. 3291-3301, XP11756031.

Ballé et al., "Variational image compression with a scale hyperprior" published as a conference paper at ICLR 2018.

Ladune "Optical Flow and Mode Selection for Learning-based Video Coding ", IEEE MMSP 2020.

Sun, et al., "PWC-Net: CNNs for Optical Flow Using Pyramid, Warping, and Cost Volume" CVPR 2018.

International Search Report dated Jun. 3, 2022 for corresponding International Application No. PCT/FR2022/050272, filed Feb. 15, 2022.

Written Opinion of the International Searching Authority dated Jun. 3, 2022 for corresponding International Application No. PCT/FR2022/050272, filed Feb. 15, 2022.

* cited by examiner

PRED1

PRED2

RIGHT MOTION COMPENSATION

LEFT MOTION COMPENSATION

RIGHT INTERMEDIATE
WEIGHTED PREDICTION

LEFT INTERMEDIATE
WEIGHTED PREDICTION

SUM OF THE INTERMEDIATE
WEIGHTINGS

WEIGHTED IMAGE PREDICTION, IMAGE CODING AND DECODING USING SUCH A WEIGHTED PREDICTION

CROSS-REFERENCE TO RELATED APPLICATIONS

This Application is a Section 371 National Stage Application of International Application No. PCT/FR2022/050272, filed Feb. 15, 2022, which is incorporated by reference in its entirety and published as WO 2022/175625 A1 on Aug. 25, 2022, not in English.

FIELD OF THE INVENTION

The present invention relates in general to the field of image processing, and more specifically to the coding and the decoding of digital images and of sequences of digital images.

The coding/decoding of digital images applies in particular to images from at least one video sequence comprising:
- images from one and the same camera and in temporal succession (2D coding/decoding),
- images from various cameras oriented with different views (3D coding/decoding),
- corresponding texture and depth components (3D coding/decoding),
- etc.

The present invention applies similarly to the coding/decoding of 2D or 3D images. The invention may in particular, but not exclusively, be applied to the video coding implemented in current AVC, HEVC and VVC video encoders and their extensions (MVC, 3D-AVC, MV-HEVC, 3D-HEVC, etc.), and to the corresponding decoding.

PRIOR ART

Current video encoders (MPEG, AVC, HEVC, VVC, AV1, etc.) use a blockwise representation of the video sequence. The images are split up into blocks, which are able to be split up again recursively. Next, each block is coded by intra-image or inter-image prediction. Thus, some images are coded by spatial prediction (intra prediction, IBC (for "Intra Block Copy") prediction), and other images are also coded by temporal prediction (inter prediction) with respect to one or more coded-decoded reference images, using motion compensation, which is well known to those skilled in the art.

A prediction block BP associated with a block currently being coded is related directly to at least one reference block $BR_0$ of the image to which the block currently being coded belongs or of an already decoded image, conventionally called reference image. In order to match the reference block $BR_0$ to the block currently being coded, the reference block $BR_0$ is displaced for each spatial position $(x,y)$ of the pixels thereof. A motion-compensated reference block $BC_0$ is then obtained. The relationship between the prediction block BP and the motion-compensated reference block $BC_0$ is then expressed as follows:

$$BP(x, y) = (1 - w) * BC_0(x, y)$$

where w is a prediction weighting parameter, which is 0 most of the time, but which may be adjustable, as explained below.

When for example a block currently being coded is predicted with respect to two reference blocks $BR_0$ and $BR_1$ belonging to one or two already decoded reference images, the two reference blocks $BR_0$ and $BR_1$ are motion-compensated, generating two motion-compensated reference blocks $BC_0$ and $BC_1$, which are then combined by linear weighting. Each pixel of the prediction block BP is the result of weighting of the pixels of the two motion-compensated reference blocks $BC_0$ and $BC_1$. More precisely, if for example the prediction is implemented row by row, and from left to right:
- the $1^{st}$ pixel at the top left of the prediction block BP is the result of weighting of the $1^{st}$ pixel at the top left of the motion-compensated reference block $BC_0$ and of the $1^{st}$ pixel at the top left of the motion-compensated reference block $BC_1$,
- the $2^{nd}$ pixel, neighboring the $1^{st}$ pixel on the first row of the prediction block BP, is the result of weighting of the $2^{nd}$ pixel neighboring the $1^{st}$ pixel on the first row of the motion-compensated reference block $BC_0$ and of the $2^{nd}$ pixel neighboring the $1^{st}$ pixel on the first row of the motion-compensated reference block $BC_1$,
- etc.,
- the last pixel at the bottom right of the prediction block BP is the result of weighting of the last pixel at the bottom right of the motion-compensated reference block $BC_0$ and of the last pixel at the bottom right of the motion-compensated reference block $BC_1$.

The most common weighting, applied by default, is the half-sum. To this end, the prediction block BP is computed according to the following relationship:

$$BP(x, y) = 0.5 * BC_0(x, y) + 0.5 * BC_1(x, y)$$

More elaborate weightings are possible.

In the HEVC standard, the linear weighting is applied uniformly to the image currently being coded. The weighting parameter w is fixed therein, and is signaled to the decoder, for each sub-image or "slice" of the image currently being coded. By default, in the case of a bi-prediction of the block currently being coded, the balanced weighting (0.5/0.5) is applied unless this is explicitly indicated in the PPS (for "Picture Parameter Set") information.

In the VVC standard, the prediction is weighted block by block using the BCW (for "bi-prediction with CU level weights") tool. A prediction block BP is computed according to the following relationship:

$$BP(x, y) = (1 - w) * BC_0(x, y) + w * BC_1(x, y)$$

where the weighting parameter w may take 5 values: 0.5, 0.625, 0.375, 1.25, −0.25. The optimum value of the weighting parameter w to be applied is determined at the encoder and signaled to the decoder for each block. It is encoded with a context element that indicates whether it is the value w=0.5 that is used, that is to say the equal weighting on the motion-compensated reference blocks $BC_0$ and $BC_1$. If not, then the weighting is signaled on 2 bits to indicate one of the 4 remaining values. This principle is adopted in the AV1 technique.

It should be noted that, regardless of the video standard used, the weighting parameter w is associated with a relatively small number of values, thereby leading to a lack of precision in the weighted prediction that is applied. Furthermore, the encoder according to the abovementioned standards systematically has to code and transmit, to the decoder, the value of the weighting parameter w that has been selected, thereby increasing the signaling cost.

AIM AND SUMMARY OF THE INVENTION

One of the aims of the invention is to rectify the drawbacks of the abovementioned prior art by improving the precision of the weighted prediction from the prior art, in favor of reducing the cost of signaling information related to this prediction.

To this end, one subject of the present invention relates to a method for predicting at least one current set of pixels, implemented by a prediction device, wherein said at least one current set of pixels is predicted based on at least one reference set of pixels, using a pixel prediction weighting function, characterized in that the pixel prediction weighting function for said at least one current set of pixels is associated with at least one weighting value computed based on analysis of at least one reference set of pixels.

Such a prediction method according to the invention advantageously makes it possible to rely only on one or more reference sets of pixels, in other words one or more sets of pixels that are already decoded at the time of the prediction, to estimate the weighting of the prediction of a current set of pixels. Since this or these reference sets of pixels are available at the time of the prediction of the current set of pixels, the estimation of the weighting of the prediction is improved as it is more spatially precise than that implemented in the prior art, which requires approximating or quantizing the one or more weighting values of the prediction.

According to one particular embodiment, the prediction weighting function is modified using at least one modification parameter that results from analysis of said at least one current set of pixels.

Such an embodiment advantageously makes it possible to apply a correction to the prediction weighting function that has been computed, when the current set of pixels contains an element that was not present/predictable in the one or more reference sets of pixels.

The invention also relates to a device for predicting at least one current set of pixels, comprising a processor that is configured to predict said at least one current set of pixels based on at least one reference set of pixels, using a pixel prediction weighting function.

Such a prediction device is characterized in that the pixel prediction weighting function for said at least one current set of pixels is associated with at least one weighting value computed based on analysis of at least one reference set of pixels.

In one particular embodiment, the prediction device is a neural network.

The use of a neural network advantageously makes it possible to optimize the quality of the weighted prediction.

Such a prediction device is in particular able to implement the abovementioned prediction method.

The invention also relates to a method for coding at least one current set of pixels, implemented by a coding device, comprising the following:

computing a signal representative of a difference between said at least one current set of pixels and a prediction set of pixels resulting from a prediction of said at least one current set of pixels,
coding the signal.

Such a coding method is characterized in that the prediction set of pixels is obtained using the abovementioned prediction method according to the invention.

Such a coding method is advantageous in that it does not require the coding of one or more prediction weighting values of the prediction weighting function. This means that this or these prediction weighting values do not need to be transmitted by the encoder to a decoder for the current set of pixels, thereby making it possible to reduce the cost of signaling the information transmitted between the encoder and the decoder in favor of better quality of the image related to the improved precision of the prediction. Furthermore, any weighting value associated with the prediction weighting function does not need to be approximated or quantized with a view to being transmitted to the decoder, thereby making it possible to make this weighting value continuous for the set of pixels to be predicted.

According to one particular embodiment, the coding method comprises the following:

coding at least one modification parameter of the prediction weighting function,
transmitting said at least one modification parameter to an image decoder.

The invention also relates to a coding device or encoder for coding at least one current set of pixels, comprising a processor that is configured to implement the following:

computing a signal representative of a difference between said at least one current set of pixels and a prediction set of pixels resulting from a prediction of said at least one current set of pixels,
coding said signal.

Such a coding device is characterized in that the prediction set of pixels is obtained using the abovementioned prediction device according to the invention.

Such a coding device is in particular able to implement the abovementioned coding method.

The invention also relates to a method for decoding at least one current set of pixels, implemented by a decoding device, comprising the following:

determining, in a data signal, data representative of a signal representative of a difference between said at least one current set of pixels and a prediction set of pixels resulting from a prediction of said at least one current set of pixels,
reconstructing said at least one current set of pixels from the determined data and from the prediction set of pixels.

Such a decoding method is characterized in that the prediction set of pixels is obtained using the abovementioned prediction method according to the invention. The advantage of such a decoding method lies in the fact that the prediction weighting function is computed autonomously by the decoder based on one or more available reference sets of pixels, without the decoder needing to read specific information from the data signal received from the encoder. Moreover, as already explained above, the at least one weighting value of the prediction weighting function, since it is neither coded nor transmitted in a data signal, may be made continuous, without having to be approximated or quantized, as is the case in the prior art.

In one particular embodiment, such a decoding method further comprises the following:

determining, in the data signal or another data signal, at least one modification parameter of the prediction weighting function, computing a modified prediction weighting function based on the analysis of said at least one reference set of pixels and said at least one determined modification parameter.

The invention also relates to a decoding device or decoder for decoding at least one current set of pixels, comprising a processor that is configured to implement the following:

determining, in a data signal, data representative of a signal representative of a difference between said at least one current set of pixels and a prediction set of pixels resulting from a prediction of said at least one current set of pixels, reconstructing said at least one current set of pixels from the determined data and from the prediction set of pixels.

Such a decoding device is characterized in that the prediction set of pixels is obtained using the abovementioned prediction device according to the invention.

Such a decoding device is in particular able to implement the abovementioned decoding method.

The invention also relates to a method for constructing at least one set of pixels from at least one reference set of pixels, implemented by a video data processing device. Such a construction method is characterized in that the set of pixels is constructed using a pixel prediction weighting function, such as the prediction function used in the abovementioned prediction method of the invention.

The prediction weighting function of the invention is thus not limited just to the context of an image prediction generating or not generating a prediction residual, and may be advantageously used in the case of an interpolation or an image synthesis based on one or more already decoded reference images.

The invention also relates to a computer program comprising instructions for implementing the prediction method according to the invention and also the coding or decoding method integrating the prediction method according to the invention, or else the abovementioned construction method, according to any one of the particular embodiments described above, when said program is executed by a processor. Such instructions may be permanently stored in a non-transitory memory medium of the prediction device implementing the abovementioned prediction method, of the encoder implementing the abovementioned coding method, of the decoder implementing the abovementioned decoding method, of the video processing device implementing the abovementioned construction method.

This program may use any programming language and be in the form of source code, object code or intermediate code between source code and object code, such as in a partially compiled form, or in any other desirable form.

The invention also targets a computer-readable recording medium or information medium comprising instructions of a computer program as mentioned above. The recording medium may be any entity or device capable of storing the program. For example, the medium may comprise a storage means, such as a ROM, for example a CD-ROM, a DVD-ROM, a synthetic DNA (deoxyribonucleic acid), etc., or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from a network such as the Internet.

Alternatively, the recording medium may be an integrated circuit in which the program is incorporated, the circuit being designed to execute or to be used in the execution of the abovementioned prediction method, coding method, decoding method or construction method.

BRIEF DESCRIPTION OF THE DRAWINGS

Other features and advantages will become apparent from reading particular embodiments of the invention, which are given by way of illustrative and non-limiting examples, and the appended drawings, in which.

DETAILED DESCRIPTION OF VARIOUS EMBODIMENTS OF THE INVENTION

Exemplary Implementations of an Image Prediction Method
General Principle of the Invention
Image Weighted Prediction Method A description is given below of a 2D or 3D image prediction method that is able to be implemented in any type of video encoders or decoders, for example compliant with the AVC, HEVC, VVC standard and their extensions (MVC, 3D-AVC, MV-HEVC, 3D-HEVC, etc.), or the like, such as for example a convolutional neural network (or CNN).

Figure 1:
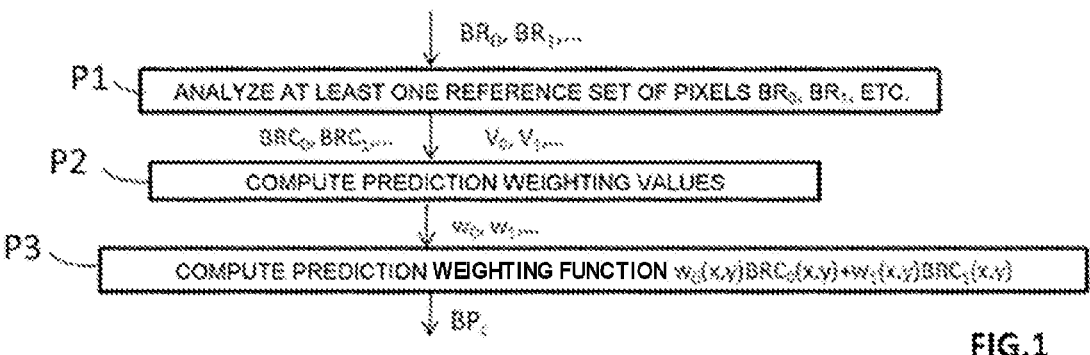
FIG. 1 shows the main steps of an image prediction method in accordance with the invention.

With reference to FIG. 1, the prediction method according to the invention uses at least one reference set of pixels $BR_0$, that is to say a reference set of pixels that has already been coded and decoded and that is therefore available at the time of the prediction. One feature of the prediction method according to the invention is that a current set of pixels $B_c$ is not considered for the prediction as it is not available at the time of the prediction.

Within the meaning of the invention, a current set of pixels $B_c$ is understood to mean:

an original current image;

a part or a region of the original current image, a block of the current image resulting from partitioning of this image in line with what is carried out in standardized AVC, HEVC or VVC encoders.

Figure 2A:
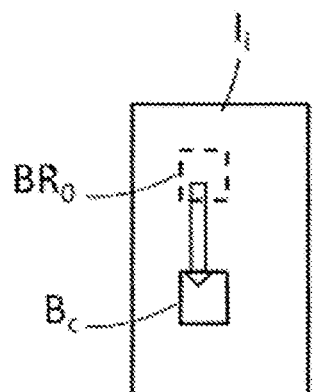
FIG. 2A shows one type of prediction used in the prediction method of FIG. 1, in a first particular embodiment of the invention.

According to the invention, as shown in FIG. 2A, the reference set of pixels $BR_0$ may belong to a current image $I_i$ that contains the current set of pixels $B_c$. In this case, the current set of pixels $B_c$ is predicted with respect to the reference set of pixels $BR_0$ using an Intra prediction, for example Intra or IBC (for "Intra Block Copy"). Of course, the current set of pixels $B_c$ may be predicted with respect to the reference set of pixels $BR_0$ and to one or more other reference sets of pixels belonging to the current image $I_i$.

Figure 2B:
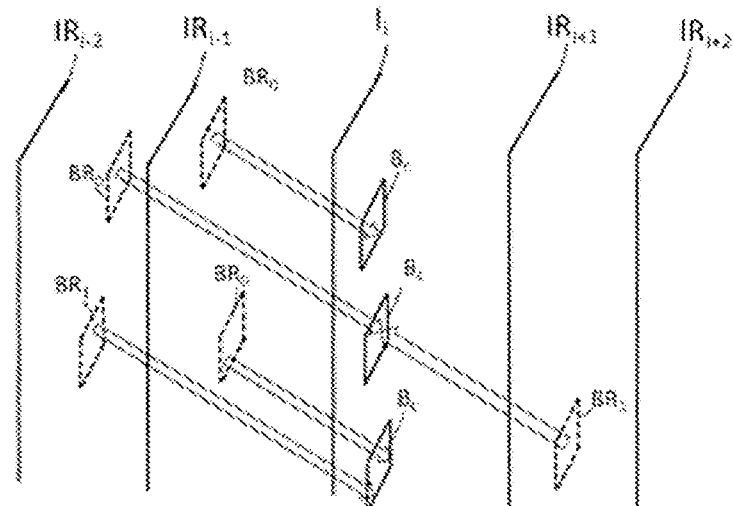
FIG. 2B shows one type of prediction used in the prediction method of FIG. 1, in a second particular embodiment of the invention.

According to the invention, as shown in FIG. 2B, the reference set of pixels $BR_0$ may belong to an already coded and decoded reference image that precedes or follows the current image $I_i$ in time. In this case, the current set of pixels $B_c$ is predicted with respect to the reference set of pixels $BR_0$ using an Inter prediction. In the example shown, the current set of pixels $B_c$ may be predicted with respect to the reference set of pixels $BR_0$ using a type P unidirectional inter prediction, the reference set of pixels $BR_0$ belonging to the immediately preceding image $IR_{i-1}$ but of course being able to belong to another reference image, such as for example the image $IR_{i-2}$ or other reference images preceding the image $IR_{i-2}$ in the coding order. Of course, one or more other reference sets of pixels may be used together with the reference set of pixels $BR_0$ to predict the current set of pixels $B_c$. In the example shown, the current set of pixels $B_c$ may also be predicted using a type B bidirectional inter prediction, with respect to the reference set of pixels $BR_0$ located in a reference image that precedes the current image $I_i$ and with respect to at least one other reference set of pixels $BR_1$ located in a reference image that follows the current image $I_i$. In the example shown, the reference set of pixels $BR_0$ is located in the reference image $IR_{i-2}$ and the reference set of pixels $BR_1$ is located in the reference image $IR_{i+1}$. Still within the context of such a type B inter prediction, and as shown in FIG. 2B, the current set of pixels $B_c$ may be predicted with respect to two reference sets of pixels $BR_0$, $BR_1$ each located in a reference image that precedes the current image $I_i$. In the example shown, the reference set of pixels $BR_0$ is located in the reference image $IR_{i-2}$ and the reference set of pixels $BR_1$ is located in the reference image $IR_{i-1}$.

Of course, one or more other reference sets of pixels may be used together with the reference sets of pixels $BR_0$ and $BR_1$ to compute the current prediction set of pixels $BP_c$.

In the embodiments presented below, it is assumed that the one or more reference sets of pixels $BR_0$, $BR_1$, etc. have the same geometry as the current set of pixels $B_c$ to be predicted. Of course, it is also possible, depending on the context of the prediction, to oversize this reference set of pixels so as to cover an area greater than or equal to that of the current set of pixels $B_c$ to be predicted.

With reference again to FIG. 1, such a prediction method according to the invention comprises the following:

In P1, said at least one reference set of pixels $BR_0$ is analyzed.

Such analysis implements a motion estimation comprising an estimation of the pixel shift between said at least one reference set of pixels $BR_0$ that was displaced beforehand and a predicted version $BP_c$ of a current set of pixels $B_c$ that is not available at the time of the prediction. This motion estimation implements conventional motion compensation, at the end of which a motion-compensated set of pixels $BRC_0$ is obtained. During this analysis, displacement information is obtained, such as a displacement vector $V_0$ that describes the displacement of $BR_0$ toward $BRC_0$.

In P2, a weighting value $w_0$ is computed for each pixel of the motion-compensated set of pixels $BRC_0$, depending on the result of the analysis performed in P1.

In P3, a predicted version $BP_c$ of a current set of pixels $B_c$ is computed according to the following function, for each coordinate (x,y) of a pixel under consideration of the motion-compensated reference set of pixels $BRC_0$:

$$BP_c(x, y) = w_0(x, y) * BRC_0(x, y)$$

When two reference sets of pixels $BR_0$ and $BR_1$ are considered during the analysis P1, thereby generating two motion-compensated sets of pixels $BRC_0$ and $BRC_1$ and the corresponding displacement vectors $V_0$, $V_1$, two weighting values $w_0$, $w_1$ are computed in P2 for the motion-compensated set of pixels $BRC_0$ and the motion-compensated set of pixels $BRC_1$, respectively. The current prediction set of pixels $BP_c$ is then computed in P3 according to the following function, for each coordinate (x,y) of a pixel under consideration of the motion-compensated sets of pixels:

$$BP_c(x, y) = w_0(x, y) * BRC_0(x, y) + w_1(x, y) * BRC_1(x, y)$$

The prediction method that has just been described above may then be implemented for each current set of pixels to be predicted, considered to be unavailable at the time of the prediction.

Exemplary Implementations of Weighted Prediction Device

Figure 3A:
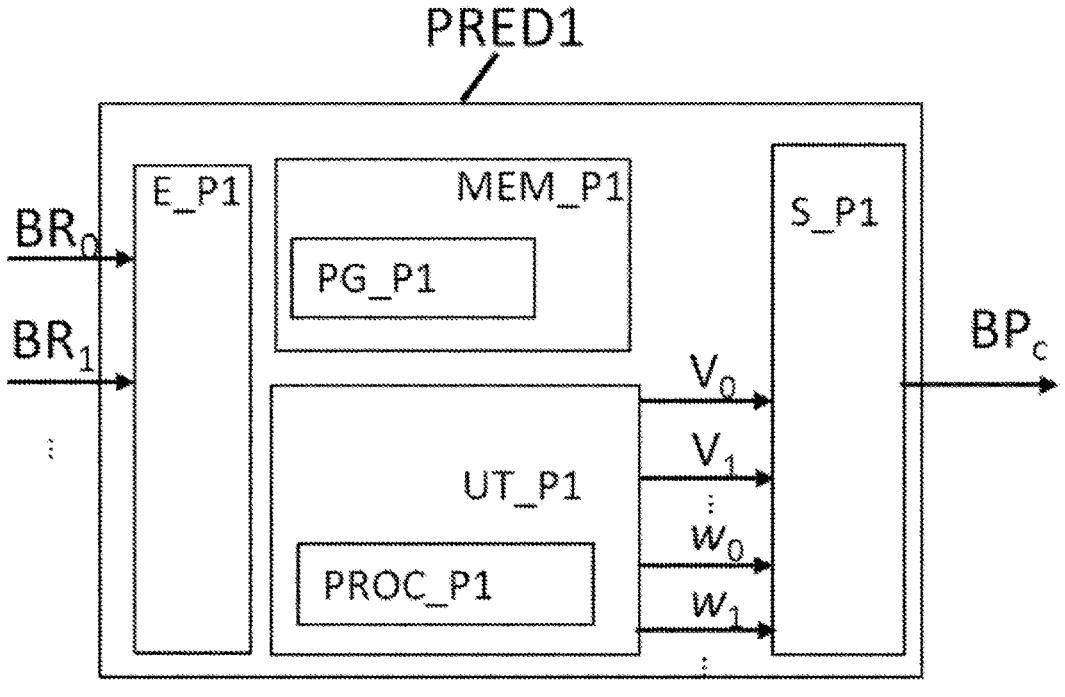
FIG. 3A shows a prediction device implementing the prediction method of FIG. 1, in a first embodiment.

FIG. 3A shows a prediction device PRED1 suitable for implementing the prediction method illustrated in FIG. 1, according to a first embodiment of the invention. According to this first embodiment, the actions performed by the prediction method are implemented by computer program instructions. To that end, the prediction device PRED1 has the conventional architecture of a computer and comprises in particular a memory MEM_P1, a processing unit UT_P1, equipped for example with a processor PROC_P1, and driven by the computer program PG_P1 stored in memory MEM_P1. The computer program PG_P1 comprises instructions for implementing the actions of the prediction method as described above when the program is executed by the processor PROC_P1.

On initialization, the code instructions of the computer program PG_P1 are for example loaded into a RAM memory (not shown) before being executed by the processor PROC_P1. The processor PROC_P1 of the processing unit UT_P1 implements in particular the actions of the prediction method described above, according to the instructions of the computer program PG_P1.

Figure 3B:
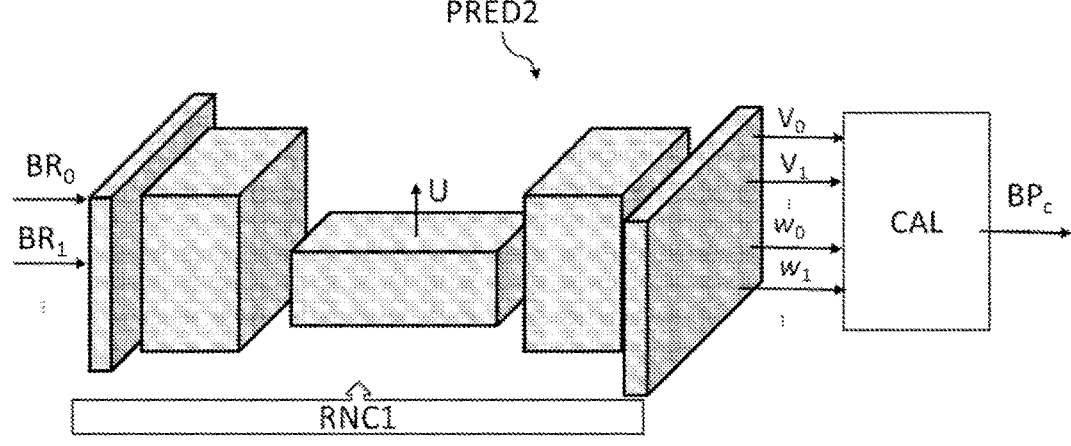
FIG. 3B shows a prediction device implementing the prediction method of FIG. 1, in a second embodiment.

The prediction device receives, at input E_P1, one or more reference sets of pixels $BR_0$, $BR_1$, etc., computes the one and/or more corresponding displacement vectors $V_0$, $V_1$, etc. along with the one and/or more corresponding weighting values $w_0$, $w_1$, etc., and delivers, at output S_P1, the abovementioned prediction set of pixels $BP_c$. FIG. 3B shows a prediction device PRED2 suitable for implementing the prediction method illustrated in FIG. 1, according to a second embodiment of the invention. According to this second embodiment, the prediction device PRED2 is a neural network, such as for example a convolutional neural network, a multilayer perceptron, an LSTM (for "Long Short Term Memory"), etc., denoted RNC1, which, from one or more reference sets of pixels $BR_0$, $BR_1$, etc. received at input, jointly implements steps P1 to P2 of the weighted prediction method of FIG. 1 in order to deliver, at output:

one or more respective motion vectors $V_0$, $V_1$, etc., one or more respective weighting values $w_0$, $w_1$, etc.

A computer CAL receives this information at input in order to compute the prediction set of pixels $BP_c$ according to the abovementioned relationship:

$$BP_c(x, y) = w_0(x, y) * BRC_0(x, y) + w_1(x, y) * BRC_1(x, y).$$

In a manner known per se, the convolutional neural network RNC1 carries out a succession of layers of filtering, non-linearity and scaling operations. Each filter that is used is parameterized by a convolution kernel, and non-linearities are parameterized (ReLU, leaky ReLU, GDN ("generalized divisive normalization"), etc.). The neural network RNC1 is for example of the type described in the document D. Sun, et al., *"PWC-Net: CNNs for Optical Flow Using Pyramid, Warping, and Cost Volume"* CVPR 2018.

In this case, the neural network RNC1 may be trained:

to estimate $V_0$, $V_1$, etc. in order to interpolate motion from $BR_0$, $BR_1$, etc. to the current image currently being coded in order to make a prediction;

to estimate the weighting values $w_0$, $w_1$, etc.

To this end, in a preliminary phase, the network RNC1 is trained to carry out operation P1. For example, the network RNC1 is trained to minimize the root mean square error between an image $I_i$ to be approximated and the result $BP_c$ of the weighted prediction of FIG. 1. At the end of this step, a latent space U representative of $V_0$, $V_1$, etc., $w_0$, $w_1$, etc. is obtained.

The network RNC1 is trained during a training phase by presenting a plurality of associated reference sets of pixels $BR_0$, $BR_1$, etc. together with a current set of pixels $B_c$, and by changing, for example using a gradient descent algorithm, the weights of the network so as to minimize the mean squared error between $B_c$ and the result $BP_c(x,y)$ computed according to the abovementioned relationship.

At the end of this preliminary training phase, the network RNC1 is fixed and suitable for use in the prediction device PRED2.

The network RNC1 is thus optimized to implement steps P1 and P2 of the weighted prediction of FIG. 1.

Embodiment of a Weighted Prediction Method Implemented by the Prediction Device PRED1

A description will now be given, with reference to FIG. 4 and FIGS. 5A to 5H, of one embodiment in which a prediction weighting for a current set of pixels is implemented in the prediction device PRED1 of FIG. 3A.

In the example shown, two reference sets of pixels $BR_0$ and $BR_1$ are taken into account for the prediction.

Figure 4:
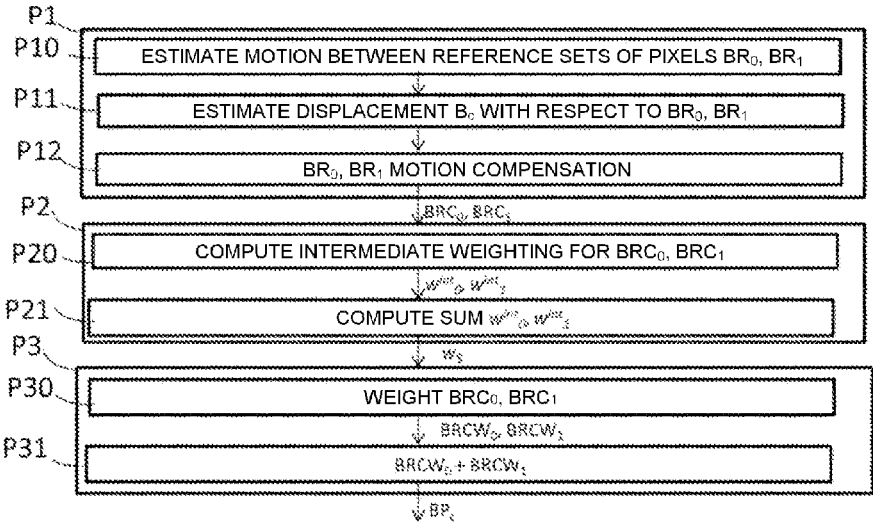
FIG. 4 shows, in more detail, certain steps of the prediction method implemented by the prediction device of FIG. 3A.

To this end, as illustrated in FIG. 4, the analysis P1 of at least one reference set of pixels comprises the following:

In P10, a motion estimate between $BR_0$ and $BR_1$ is computed. Such a step is performed through conventional motion search steps, such as for example an estimation of displacement vectors.

Figure 5A:
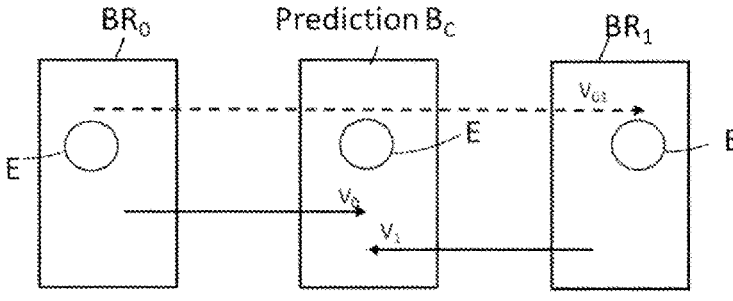
FIG. 5A shows a first exemplary displacement of a predicted version of a current set of pixels with respect to two reference sets of pixels.
Figure 5B:
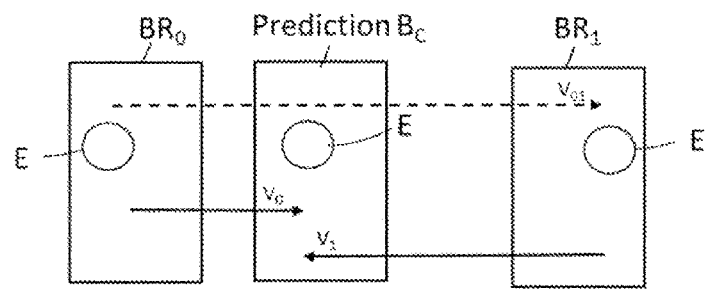
FIG. 5B shows a second exemplary displacement of a predicted version of a current set of pixels with respect to two reference sets of pixels.
Figure 5C:
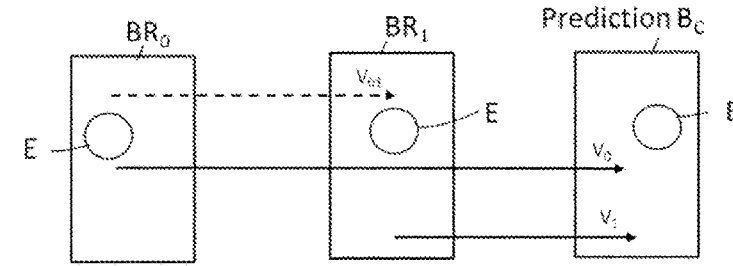
FIG. 5C shows a third exemplary displacement of a predicted version of a current set of pixels with respect to two reference sets of pixels.

FIGS. 5A to 5C respectively show three different exemplary displacements of a predicted version $BP_c$ of the current set of pixels $B_c$ with respect to two reference sets of pixels $BR_0$ and $BR_1$, which may be encountered during this step P10. In the example of FIGS. 5A to 5C, the displacement of an element E (symbolized by a circle) between the reference sets of pixels $BR_0$ and $BR_1$ is represented by a field of motion vectors. For the sake of simplification, a single vector, denoted $V_{01}$ and shown in dotted lines in FIGS. 5A to 5C, is shown in order to describe, in the example shown, the motion of the element E from $BR_0$ to $BR_1$ (the motion on the other portions of the image being considered to be zero). However, it goes without saying that there are as many motion vectors as there are pixels representing the reference sets of pixels $BR_0$ to $BR_1$, as for example in the case of an optical flow motion estimation. According to another example not shown in FIGS. 5A to 5C, a vector $V_{10}$, describing the (opposite) motion from $BR_1$ to $BR_0$, could be computed.

With the vector $V_{01}$ or $V_{10}$ having been obtained in P10, P11 (FIG. 4) comprises estimating the displacement of the current set of pixels $B_c$ to be predicted with respect to $BR_0$ and $BR_1$. This estimation is illustrated in FIGS. 5A to 5C, where the displacement of the element E is estimated at a time instant other than that at which $BR_0$ and $BR_1$ are located, which is the instant at which the current set of pixels $B_c$ is located. Using the same conventions as for the computing of $V_{01}$ or $V_{10}$:

a single vector $V_0$, which describes the motion from $BR_0$ to the predicted position of $B_c$, is computed from the vector $V_{01}$, a single vector $V_1$, which describes the motion from $BR_1$ to the predicted position of $B_c$, is computed from the vector $V_{01}$.

In the example of FIG. 5A, in which the current set of pixels $B_c$ is located halfway in time between $BR_0$ and $BR_1$, then the displacement of the element E at the current instant is estimated as corresponding to half the displacement between $BR_0$ and $BR_1$, that is to say half the vector $V_{01}$ or $V_{10}$. Such a displacement configuration is encountered in the case where for example, adopting the same notations as in FIG. 2B, $BR_0$ belongs to the reference image $IR_{i-1}$ and $BR_1$ belongs to the reference image $IR_{i+1}$.

In the example of FIG. 5B, in which the current set of pixels $B_c$ is located closer in time to $BR_0$ than to $BR_1$, then the displacement of the element E at the current instant is estimated as being shorter than half the displacement between $BR_0$ and $BR_1$. For example, if $BR_0$ belongs to the reference image $IR_{i-1}$ and $BR_1$ belongs to the reference image $IR_{i+2}$, then the displacement of the element E at the current instant is estimated as corresponding to one third of the displacement between $BR_0$ and $BR_1$, that is to say one third of the vector $V_{01}$ or $V_{10}$.

In the example of FIG. 5C, in which the current set of pixels $B_c$ is located after $BR_0$ and then $BR_1$ in time, $BR_0$ belonging to the reference image $IR_{i-2}$ and $BR_1$ belonging to the reference image $IR_{i-2}$, then the displacement of the element E at the current instant is estimated as twice the displacement between $BR_0$ and $BR_1$, that is to say twice the vector $V_{01}$ or $V_{10}$.

Figure 5D:
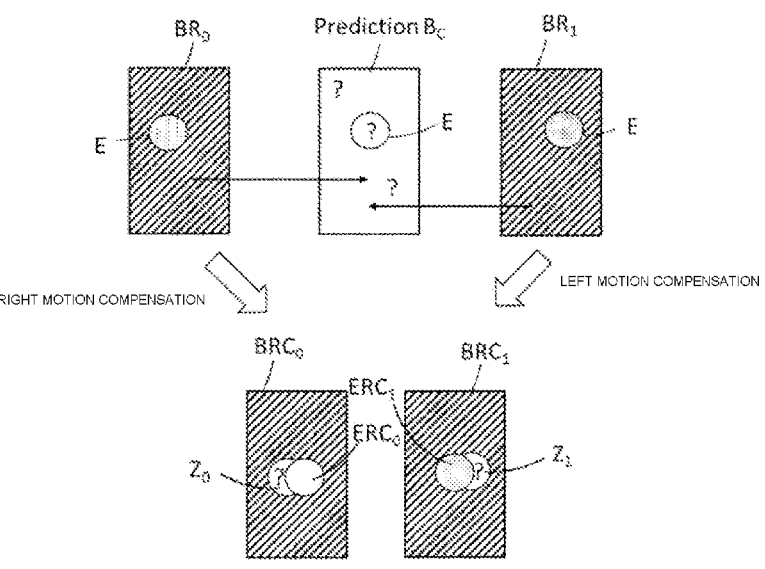
FIG. 5D shows motion compensation implemented in the case of the type of displacement of FIG. 5A, in one particular embodiment of the invention.

With reference to FIGS. 4 and 5D, in P12, $BR_0$ and $BR_1$ are each motion-compensated using the vectors $V_0$ and $V_1$, in order to respectively create two predicted versions of $B_c$, denoted $BRC_0$ and $BRC_1$.

By way of illustration in FIG. 5D, it is considered that the vectors $V_0$ and $V_1$ were obtained for example in accordance with the motion configuration shown in FIG. 5A, for which the displacement of the element E at the current instant is estimated as corresponding to half the displacement between $BR_0$ and $BR_1$, that is to say half the vector $V_{01}$ or $V_{10}$.

FIG. 5D shows:

a right-motion-compensated set of pixels $BRC_0$, on which the interpolated position of the element E comprises a set of pixels $ERC_0$ resulting from the motion compensation of the element E of $BR_0$, by the vector $V_0$, a left-motion-compensated set of pixels $BRC_1$, on which the interpolated position of the element E comprises a set of pixels $ERC_1$ resulting from the motion compensation of the element E of $BR_1$, by the vector $V_1$.

In contrast, a part $Z_0$ of $ERC_0$ and a part $Z_1$ of $ERC_1$ are undefined since they correspond to the unknown content that is located behind the element E of $BR_0$ and the element E of $BR_1$. However, as may be seen in FIG. 5D, the part $Z_0$ is defined in $ERC_1$ and the part $Z_1$ is defined in $ERC_0$.

Figure 5E:
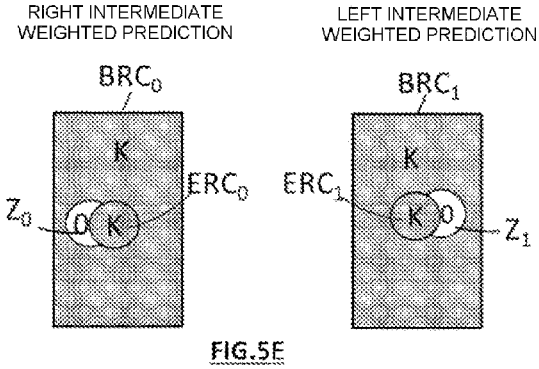
FIG. 5E shows a weighted prediction implemented at the end of the motion compensation of FIG. 5D, in one particular embodiment of the invention.

The computing P2 of prediction weighting values $w_0$ and $w_1$ then comprises the following:

With reference to FIGS. 4 and 5E, to achieve an efficient combination of the motion-compensated reference sets of pixels $BRC_0$ and $BRC_1$, in accordance with the invention, P20 comprises computing, pixel by pixel, intermediate weightings $w^{int}_0(x,y)$ and $w^{int}_1(x,y)$ for the two predicted versions $BRC_0$ and $BRC_1$, respectively. Such computing makes it possible to isolate the parts of $BR_0$ and $BR_1$ that are not defined respectively in $BRC_0$ and $BRC_1$.

To this end, as illustrated in FIG. 5E, it is proposed:

to assign to zero the weighting value for each pixel of the parts $Z_0$ and $Z_1$, respectively, that is to say $w^{int}_0(x,y)=0$ and $w^{int}_1(x,y)=0$, the parts $Z_0$ and $Z_1$ being illustrated in white, to assign to a constant K the weighting value for each defined pixel of the motion-compensated reference sets of pixels $BRC_0$ and $BRC_1$, that is to say $w^{int}_0(x,y)=K$ and $w^{int}_1(x,y)=K$ with for example K=0.5, corresponding to the gray color in FIG. 5E.

At the end of this operation, what is obtained is an intermediate weighting in which, for each of the motion-compensated reference sets of pixels $BRC_0$ and $BRC_1$, the white content corresponds to $w^{int}_0(x,y)=0$ and $w^{int}_1(x,y)=0$ and the gray content corresponds to $w^{int}_0(x,y)=0.5$ and $w^{int}_1(x,y)=0.5$.

With reference to FIG. 4, P21 comprises computing the sum $w_s(x,y)$ of the intermediate weightings $w^{int}_0(x,y)$ and $w^{int}_1(x,y)$, where $$w_S(x, y) = w_0^{int}(x, y) + w_1^{int}(x, y)$$

Figure 5F:
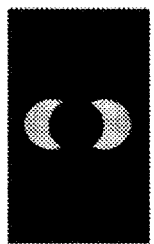
FIG. 5F shows summed weighting implemented at the end of the weighted prediction of FIG. 5E, in one particular embodiment of the invention.

The computing of the sum of the intermediate weightings $w^{int}_0(x,y)$ and $w^{int}_1(x,y)$ is illustrated in FIG. 5F, in which the black content corresponds to $w_s(x,y)=1$ and the gray content corresponds to $w_s(x,y)=0.5$.

The computing P3 of the prediction weighting function then comprises the following:

With reference to FIG. 4, during the operation P30, the motion-compensated predicted versions $BRC_0$ and $BRC_1$ are weighted by their respective weightings $w_0$ and $w_1$. Weighted compensated predicted versions $BRC_0$ and $BRC_1$ are then obtained.

To this end, the following compensation weightings $w_0(x, y)$ and $w_1(x,y)$ are computed for each motion-compensated reference set of pixels $BRC_0$ and $BRC_1$, respectively:

$$w_0(x, y) = w_0^{int}(x, y)/w_s(x, y)$$

and $$w_1(x, y) = w_1^{int}(x, y)/w_s(x, y)$$

Figure 5G:
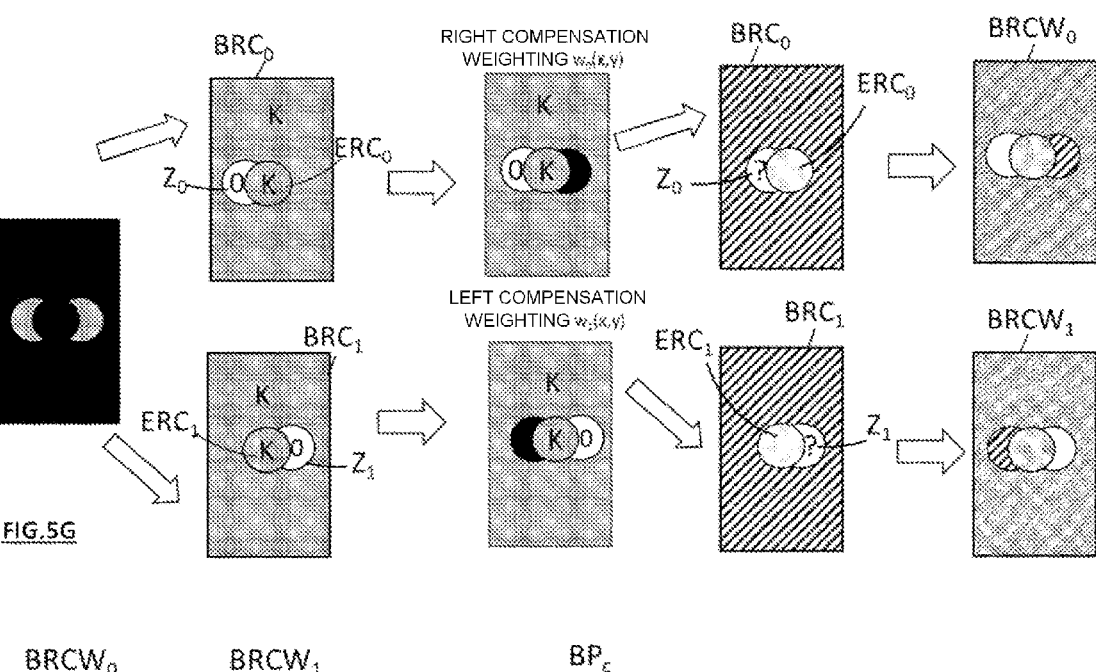
FIG. 5G shows compensated weighting implemented at the end of the summed weighting of FIG. 5F, in one particular embodiment of the invention.

Such compensation weighting is shown in FIG. 5G. The white content corresponds to the undefined regions $Z_0$ and $Z_1$ for which $w_0(x,y)=0$ and $w_1(x,y)=0$. The black content corresponds to the perfectly defined regions for which $w_0(x,y)=1$ and $w_1(x,y)=1$. The gray content corresponds to the background and to the element E, for which $w_0(x,y)=0.5$ and $w_1(x,y)=0.5$.

The predicted versions $BRC_0$ and $BRC_1$ are then motion-compensated and weighted by their respective weightings $w_0$ and $w_1$. Weighted compensated predicted versions $BRCW_0$ and $BRCW_1$ are then obtained.

Figure 5H:
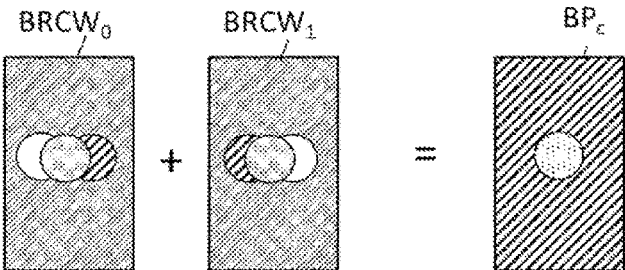
FIG. 5H shows the obtaining of a predicted version of a current set of pixels from the compensated weighting illustrated in FIG. 5G, in one particular embodiment of the invention.

With reference to FIGS. 4 and 5H, during the operation P31, the weighted compensated predicted versions $BRCW_0$ and $BRCW_1$ are summed, providing a motion-compensated prediction set of pixels $BP_c$.

This has thus constructed motion compensation including a compensation weighting determined by elements present only at the time of the prediction, that is to say only on the reference sets of pixels $BR_0$ and $BR_1$. One particular advantage of such a compensation weighting compared to the currently standardized solutions lies in the fact that, with $BR_0$ and $BR_1$ being perfectly known at the time of the prediction and the prediction according to the invention using only $BR_0$ and $BR_1$, it is possible to effectively deal with disocclusions during the prediction, as illustrated in FIGS. 5D to 5H, where the abovementioned occluded regions $Z_0$ and $Z_1$ may be restored with very good spatial precision.

The prediction weighting may be presented in another form. For example, a single weighting w may be used. Then, w weights the motion-compensated reference set of pixels $BRC_0$ and $(1-w)$ weights the motion-compensated reference set of pixels $BRC_1$.

w may be computed based on the above embodiment starting from the weighting values $w_0$ and $w_1$ computed beforehand, and by performing:

$$w(x, y) = \frac{w_0(x, y) + 1 - w_1(x, y)}{2}$$

Although a prediction method has been described above, such a method could also be implemented to construct or synthesize a set of pixels $B_c$ from one or more reference sets of pixels $BR_0$, $BR_1$, etc. using the weighted prediction function that has just been described. The prediction method could be called a construction or synthesis method for the set of pixels $B_c$, corresponding for example to a missing set of pixels or a set of pixels not captured by a camera (360° video). In this case, strictly speaking, the prediction devices PRED1 and PRED2 will be considered more to be construction or synthesis devices. The prediction device PRED1 could thus implement a so-called view "synthesis" algorithm. For example, the VSRS (for "View Synthesis Reference") software, the VVS ("Versatile View Synthesizer") algorithm, may be used as view synthesis algorithm. The construction or synthesis device PRED2 may for its part, as described above, be a neural network, such as for example a convolutional neural network, a multilayer perceptron, an LSTM (for "Long Short Term Memory"), etc.

Image Coding Method

General Principle

A description is given below, with reference to FIG. 6, of an image coding method implementing the weighted prediction described with reference to FIG. 1.

Such a coding method comprises the following:

In C1, the weighted prediction, in its steps P1 to P3 illustrated in FIG. 1, is implemented, generating the current prediction set of pixels $BP_c$.

The following coding steps are conventional and compliant with AVC, HEVC, VVC coding or the like. Thus:

in C2, a signal $BE_c$ representative of the difference between the current set of pixels $B_c$ and the current prediction set of pixels $BP_c$ obtained in C1 is computed;

in C3, in the case where this signal $BE_c$ is the one that optimizes the coding with respect to a conventional coding performance criterion, such as for example minimizing the distortion/data rate cost or else the choice of the best efficiency/complexity compromise, which are criteria that are well known to those skilled in the art, the signal $BE_c$ is quantized and coded.

At the end of this operation, a quantized and coded difference signal $BE_c^{cod}$ is obtained.

During the coding C3, multiple coding possibilities may be explored, for example a plurality of prediction weighting values $w_0$, $w_1$, etc. may be investigated to find the best data rate/distortion or efficiency/complexity compromise.

The encoder may put the weighting values computed according to the prediction method described above in competition with weighting values that it may choose to transmit. To this end, it may evaluate the quality of the prediction BPc obtained from the above prediction method and measure the prediction error, for example using a root mean squared error. This prediction error may be compared with the prediction error resulting from a set of pairs of predetermined weighting values $(w_0, w_1)$ as used in current video standards. This set may be restricted to (0.5, 0.5), as for example in the HEVC (for "High Efficiency Video Coding") standard or comprise other values, such as for example those used in the BCW (for "Bi-prediction with CU level Weights") tool of the VVC (for "Versatile Video Coding") standard. A flag will indicate to the decoder whether it should use the prediction method described above or whether it should apply the VVC BCW tool or whether it should apply the HEVC balanced prediction.

This putting of the prediction weighting values $w_0$, $w_1$, etc. into competition has the advantage of optimizing the precision of the weighted prediction in comparison with the default prediction weighting implemented in the prediction devices from the prior art. Indeed, the prediction weighting of the invention generates more precise weighting values, but may lead to greater distortion when the signal is not predictable. A conventional prediction weighting, although it is less spatially precise and at the expense of a data rate to be transmitted, may lead to lower distortion.

In C4, the data of the quantized and coded difference signal $BE_c^{cod}$ are written to a transport stream F able to be transmitted to a decoder, which will be described later in the description.

By contrast, in accordance with the invention, the weighting $w_0$ and/or the weighting $w_1$ are advantageously neither coded nor transmitted to the decoder.

Of course, in the case where the quantized and coded difference signal $BE_c$ is zero, which may be the case for the SKIP coding mode, the abovementioned steps C2 and C4 are not implemented.

Encoder Exemplary Implementations

Figure 6:
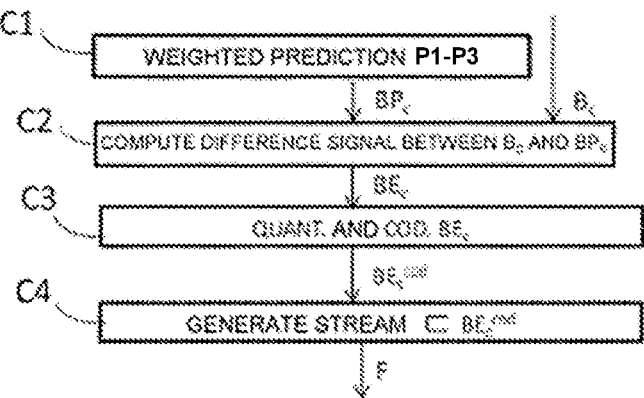
FIG. 6 shows the main steps of an image coding method implementing the prediction method of FIG. 1, in one particular embodiment of the invention.
Figure 7A:
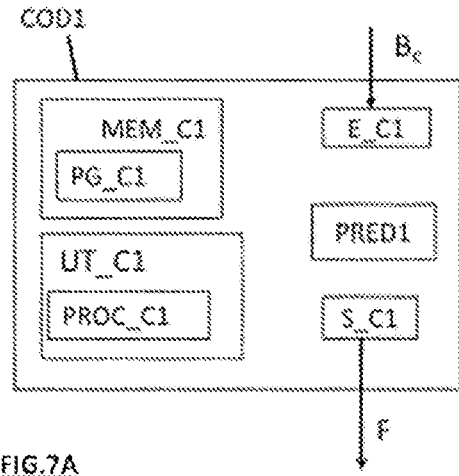
FIG. 7A shows an encoder implementing the coding method of FIG. 6, in a first embodiment.

FIG. 7A shows an encoder COD1 suitable for implementing the coding method illustrated in FIG. 6, according to a first embodiment of the invention. The encoder COD1 comprises the prediction device PRED1.

According to this first embodiment, the actions performed by the coding method are implemented by computer program instructions. To that end, the coding device COD1 has the conventional architecture of a computer and comprises in particular a memory MEM_C1, a processing unit UT_C1, equipped for example with a processor PROC_C1, and driven by the computer program PG_C1 stored in memory MEM_C1. The computer program PG_C1 comprises instructions for implementing the actions of the coding method as described above when the program is executed by the processor PROC_C1.

On initialization, the code instructions of the computer program PG_C1 are for example loaded into a RAM memory (not shown) before being executed by the processor PROC_C1. The processor PROC_C1 of the processing unit UT_C1 implements in particular the actions of the coding method described above, according to the instructions of the computer program PG_C1.

The encoder COD1 receives, at input E_C1, a current set of pixels $B_c$ and delivers, at output S_C1, the transport stream F, which is transmitted to a decoder using a suitable communication interface (not shown).

Figure 7B:
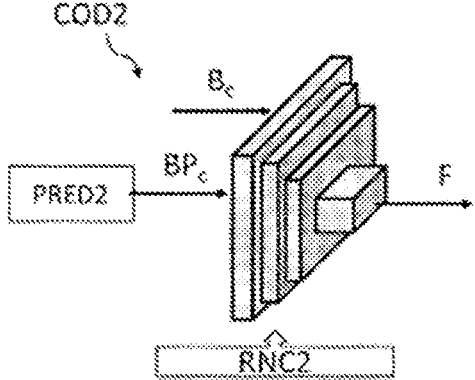
FIG. 7B shows an encoder implementing the coding method of FIG. 6, in a second embodiment.

FIG. 7B shows an encoder COD2 suitable for implementing the coding method illustrated in FIG. 6, according to a second embodiment of the invention. The encoder COD2 comprises the abovementioned prediction device PRED2 followed by a convolutional neural network RNC2 that for example computes and then codes the difference signal $BE_c$ or codes the current set of pixels $B_c$ together with the prediction set of pixels $BP_c$ generated by the prediction device PRED2. Such a network RNC2 is for example of the type described in the document: Ladune "*Optical Flow and Mode Selection for Learning-based Video Coding*", IEEE MMSP 2020.

Image Decoding Method

General Principle

A description is given below, with reference to FIG. 8, of an image decoding method implementing the weighted prediction described with reference to FIG. 1.

Such a decoding method implements image decoding corresponding to the image coding of FIG. 6. In particular, apart from the weighted prediction, the decoding method implements conventional decoding steps that are compliant with AVC, HEVC, VVC decoding or the like.

The decoding method comprises the following:

In D1, data of the coded difference signal $BE_c^{cod}$ are extracted, in a conventional manner, from the received transport stream F.

In D2, $BE_c^{cod}$ is decoded in a conventional manner. At the end of this operation, a decoded difference signal $BE_c^{dec}$ is obtained.

In D3, the weighted prediction according to the invention, in its steps P1 to P3 illustrated in FIG. 1, is implemented, generating the current prediction set of pixels $BP_c$.

In D4, a reconstructed current set of pixels $BD_c$ is computed by combining the decoded difference signal $BE_c^{dec}$ obtained in D2 with the prediction set of pixels $BP_c$ obtained in D3.

In a manner known per se, the reconstructed current set of pixels $BD_c$ may possibly undergo filtering by a loop filter performed on the reconstructed signal, which is well known to those skilled in the art.

Of course, in the case where the difference signal $BE_c$ that was computed during the abovementioned coding method is zero, which may be the case for the SKIP coding mode, the abovementioned steps D1 and D2 are not implemented.

Decoder Exemplary Implementations

Figure 8:
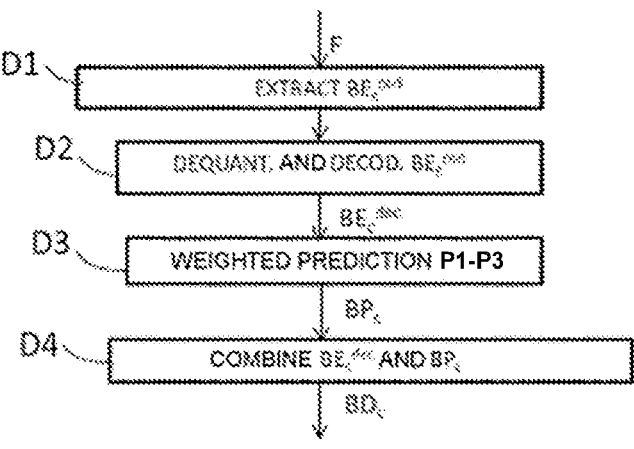
FIG. 8 shows the main steps of an image decoding method implementing the prediction method of FIG. 1, in one particular embodiment of the invention.
Figure 9A:
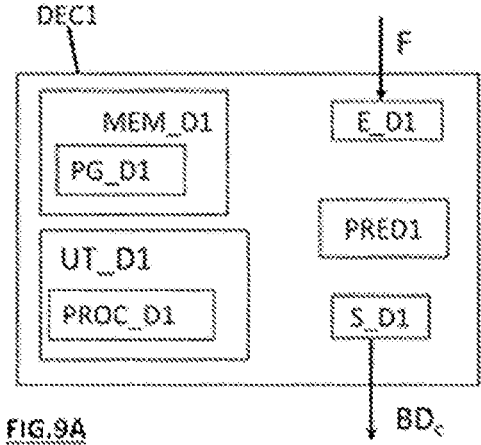
FIG. 9A shows a decoder implementing the decoding method of FIG. 8, in a first embodiment.

FIG. 9A shows a decoder DEC1 suitable for implementing the decoding method illustrated in FIG. 8, according to a first embodiment of the invention. The decoder DEC1 comprises the prediction device PRED1.

According to this first embodiment, the actions performed by the decoding method are implemented by computer program instructions. To that end, the decoder DEC1 has the conventional architecture of a computer and comprises in particular a memory MEM_D1, a processing unit UT_D1, equipped for example with a processor PROC_D1, and driven by the computer program PG_D1 stored in memory MEM_D1. The computer program PG_D1 comprises instructions for implementing the actions of the decoding method as described above when the program is executed by the processor PROC_D1.

On initialization, the code instructions of the computer program PG_D1 are for example loaded into a RAM memory (not shown) before being executed by the processor PROC_D1. The processor PROC_D1 of the processing unit UT_D1 implements in particular the actions of the decoding method described above in connection with FIG. 8, according to the instructions of the computer program PG_D1.

The decoder DEC1 receives, at input E_D1, the transport stream F transmitted by the encoder COD1 of FIG. 7A and delivers, at output S_D1, the current decoded set of pixels $BD_c$.

Figure 9B:
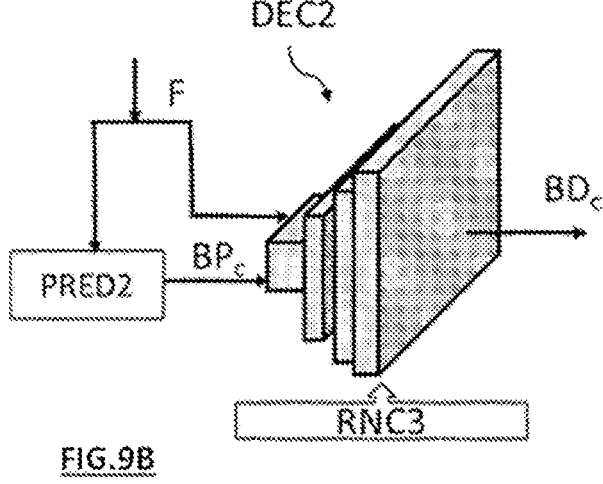
FIG. 9B shows a decoder implementing the decoding method of FIG. 8, in a second embodiment.

FIG. 9B shows a decoder DEC2 suitable for implementing the decoding method illustrated in FIG. 8, according to a second embodiment of the invention. The decoder DEC2 comprises the abovementioned prediction device PRED2 followed by a convolutional neural network RNC3 that for example decodes the coded difference signal $BE_c^{cod}$ or decodes the coded difference signal $BE_c^{cod}$ together with the prediction set of pixels $BP_c$ generated by the prediction device PRED2. Such a network RNC3 is for example of the type described in the document: Ladune "*Optical Flow and Mode Selection for Learning-based Video Coding*", IEEE MMSP 2020.

Variant of the Image Weighted Prediction Method

A description will now be given, with reference to FIGS. 10 and 11, of one variant of the weighted prediction method illustrated in FIG. 1, as implemented in an encoder COD3.

Such a variant aims to improve the weighted prediction method of FIG. 1 when the precision/quality of the prediction that is obtained is not satisfactory.

Figure 10:
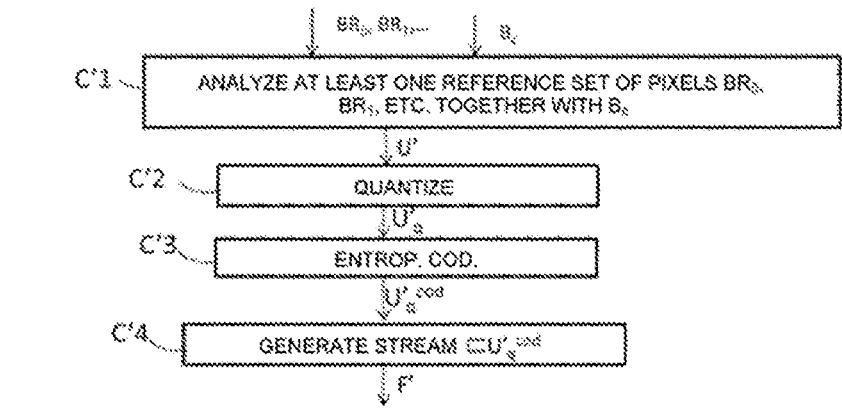
FIG. 10 shows the steps of an image coding method implementing a modification of the prediction method of FIG. 1, in one particular embodiment of the invention.

To this end, on the encoder side, as illustrated in FIG. 10, in C'1, said at least one reference set of pixels $BR_0$ is analyzed together with the current set of pixels $B_c$. For example, two reference sets of pixels $BR_0$ and $BR_1$ are analyzed together with $B_c$. In the example shown, $BR_0$ is located before $B_c$ in time and $BR_1$ is located after $B_c$ in time.

Figure 11:
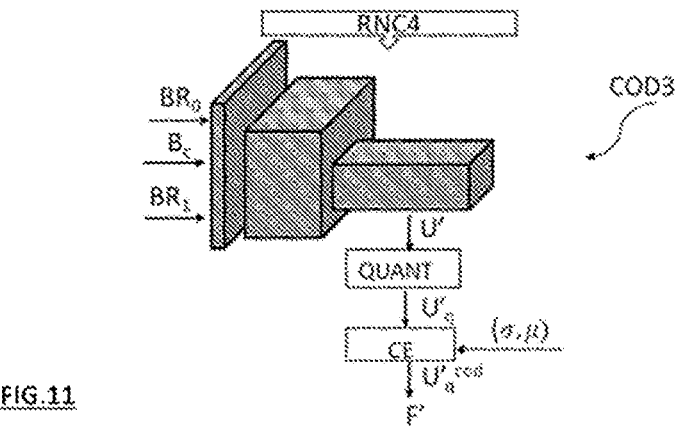
FIG. 11 shows an encoder implementing the coding method of FIG. 10, in one particular embodiment of the invention.

As shown in FIG. 11, the analysis C'1 is implemented using a convolutional neural network RNC4 that creates, from the two reference sets of pixels $BR_0$ and $BR_1$ and from the current set of pixels $B_c$, a transformation through a certain number of layers, such as for example layers implementing convolutional filters (CNN) followed by layers implementing non-linearities and decimations, as described in the document: Ladune "*Optical Flow and Mode Selection for Learning-based Video Coding*", IEEE MMSP 2020.

At the end of step C'1, a set of latent variables is obtained in the form of a signal U'. The signal U' is quantized in C'2 by a quantizer QUANT, for example a uniform or vector quantizer controlled by a quantization parameter. A quantized signal $U'_q$ is then obtained.

At C'3, the quantized signal $U'_q$ is coded using an entropy encoder CE, for example of arithmetic type, with a determined statistic. This statistic is for example parameterized by probabilities of statistics, for example by modeling the variance and the mean of a Laplacian law $(\sigma, \mu)$, or else by considering hyperpriors as in the publication: "*Variational image compression with a scale hyperprior* by Ballé, which was presented at the ICLR 2018 conference. A coded quantized signal $U'_q^{cod}$ is then obtained.

Figure 13:
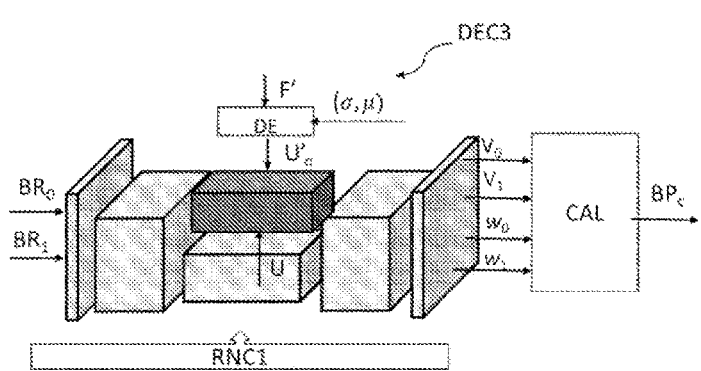
FIG. 13 shows a decoder implementing the decoding method of FIG. 12, in one particular embodiment of the invention.

In C'4, the coded quantized signal $U'_q^{cod}$ is written to a transport stream F', which is transmitted to a decoder DEC3, illustrated in FIG. 13.

A description will now be given, with reference to FIGS. 12 and 13, of one variant of the weighted prediction method illustrated in FIG. 1, as implemented in a decoder DEC3.

Figure 12:
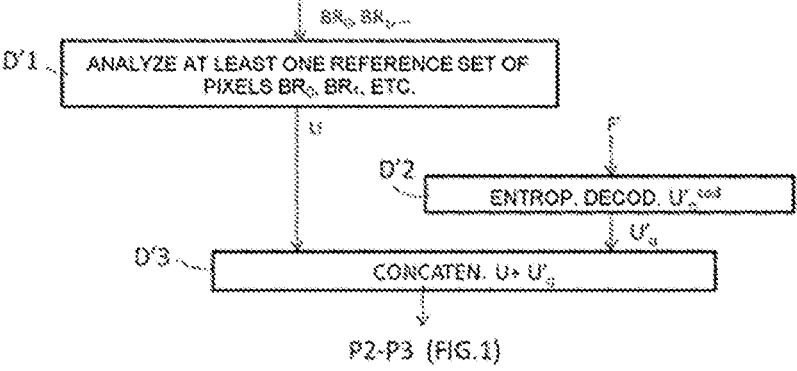
FIG. 12 shows the steps of an image decoding method implementing a modification of the prediction method of FIG. 1, in one particular embodiment of the invention.

To this end, on the decoder side, as illustrated in FIG. 12, in D'1, at least one reference set of pixels $BR_0$ is analyzed, two sets of reference pixels $BR_0$ and $BR_1$ in the example shown. Such analysis is identical to that performed in step P1 of FIG. 1, using the neural network RNC1. At the end of this step, a latent space U representative of $V_0$, $V_1$, etc., $w_0$, $w_1$, etc. is obtained.

Following the reception of the stream F', in D'2, entropy decoding is carried out on the coded quantized signal $U'_q^{cod}$ using an entropy decoder DE corresponding to the entropy encoder CE of FIG. 11, with the same determined statistic, such as the modeling of the variance and of the mean of a Laplacian law ($\sigma,\mu$). A decoded quantized signal $U'_q$ is obtained at the end of this operation.

In D'3, the decoded quantized signal $U'_q$ is concatenated with the latent space U obtained by the neural network RNC1 of FIG. 13 and representative of the analysis of only the reference sets of pixels $BR_0$ and $BR_1$.

The neural network RNC1 then processes this concatenation through various layers, in the same way as in step P2 of FIG. 1, in order to estimate the motion information $V_0$, $V_1$, etc., along with the corresponding weighting values $w_0$, $w_1$, etc.

In a manner corresponding to FIG. 3B, a computer CAL receives this information at input in order to compute the prediction set of pixels $BP_c$ according to the abovementioned relationship. This step is identical to step P3 of FIG. 1.

In the embodiments that have been disclosed above with reference to FIG. 3A et seq., two reference sets of pixels $BR_0$, $BR_1$ are used in the weighted prediction method.

These embodiments may be extended to three or more reference sets of pixels. To this end, the neural network RNC1 described with reference to FIG. 3B will be trained from three reference sets of pixels $BR_0$, $BR_1$, $BR_2$ or more to obtain the prediction set of pixels $BP_c(x,y)$.

Figure 14:
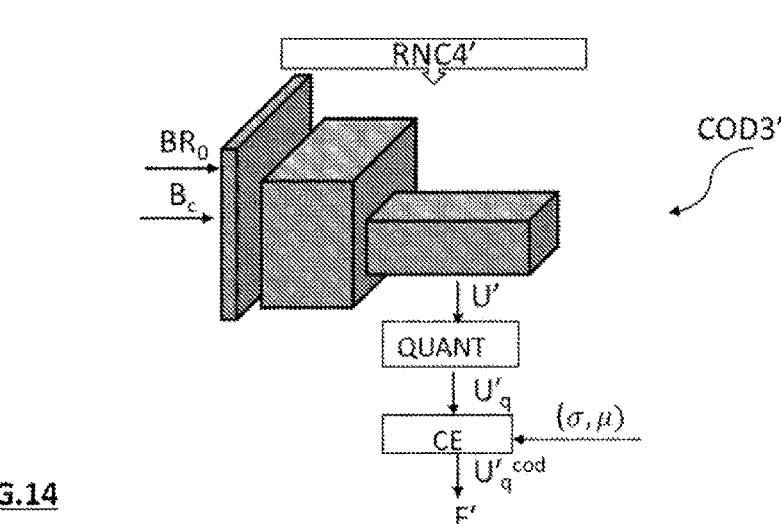
FIG. 14 shows an encoder implementing the coding method of FIG. 10, in another particular embodiment of the invention.
Figure 15:
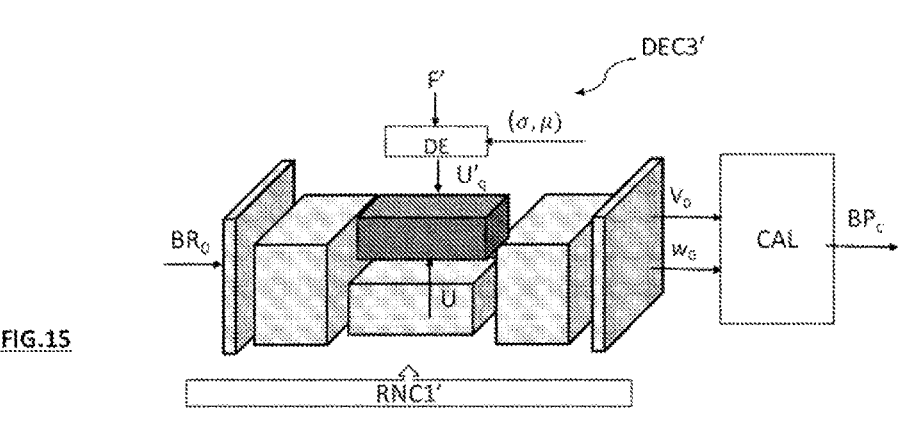
FIG. 15 shows a decoder implementing the decoding method of FIG. 12, in another particular embodiment of the invention.

A degraded weighted prediction mode is of course possible, for example when only one reference frame is used for the prediction (case of type P prediction in video coding mode). Such a degraded mode is illustrated with reference to FIGS. 14 and 15. The example of FIG. 14 shows an encoder COD3' that is similar to the encoder COD3 of FIG. 11. The encoder COD3' differs from the encoder COD3 through its neural network RNC4', which is trained from a single reference set of pixels, $BR_0$ in FIG. 14. The neural network RNC4' thus generates a signal U' from the single reference set of pixels $BR_0$ and from the current set of pixels $B_c$. As already described above in connection with FIGS. 10 and 11, the signal U' is quantized in order to obtain a quantized signal $U'_q$. The quantized signal $U'_q$ is entropically coded. A coded quantized signal $U'^{cod}_q$ is then obtained. The coded quantized signal $U'^{cod}_q$ is written to a transport stream F', which is transmitted to a decoder DEC3', illustrated in FIG. 15.

The decoder DEC3' differs from the decoder DEC3 of FIG. 13 through its neural network RNC1', which analyzes a single reference set of pixels, $BR_0$ in the example shown. At the end of this analysis, a latent space U representative of $V_0$ and $w_0$ is obtained. As already explained above with reference to FIG. 12, following the reception of the stream F', the coded quantized signal $U'^{cod}_q$ is entropically decoded, generating a decoded quantized signal $U'_q$. The decoded quantized signal $U'_q$ is concatenated with the latent space U obtained by the neural network RNC1'. The neural network RNC1' then processes this concatenation in order to estimate the single item of motion information $V_0$ along with the single corresponding weighting value $w_0$. The computer CAL receives this information at input in order to compute, in a conventional manner, the prediction set of pixels $BP_c$ according to the abovementioned relationship with $BRC_1=0$, since $BR_1$ was not considered, and therefore not motion-compensated. Likewise, $w_1(x,y)=0$.

This means that the prediction set of pixels $BP_c$ obtained at the end of step P3 of FIG. 1 and delivered at output of the computer CAL is:

$$BP_c(x, y) = w_0(x, y) * BRC_0(x, y) + 0 * 0 = w_0(x, y) * BRC_0(x, y).$$

The invention claimed is:

1. A prediction method comprising:
predicting at least one current set of pixels belonging to a current image, implemented by a prediction device, the predicting comprising:
receiving at least one reference set of pixels previously decoded, each reference set of pixels belonging to the current image or to an already decoded reference image;
predicting the at least one current set of pixels based on the at least one reference set of pixels and using a pixel prediction weighting function, wherein said pixel prediction weighting function for said at least one current set of pixels comprises at least one weighting value computed based on an analysis of the at least one reference set of pixels; and
outputting the at least one current set of pixels.

2. The prediction method as claimed in claim 1, wherein the prediction weighting function is modified using at least one modification parameter, wherein the at least one modification parameter is a signal that results from a neuronal filter applied jointly to said at least one current set of pixels and said at least one reference set of pixels.

3. The prediction method as claimed in claim 1, wherein the at least one weighting value is computed pixel-by-pixel for each pixel of the current set of pixels.

4. The prediction method as claimed in claim 1, wherein the at least one weighting value is computed based on an analysis of the at least one reference set of pixels only.

5. The prediction method as claimed in claim 1, wherein the at least one weighting value is not signaled in a data stream representative of the current image.

6. The prediction method as claimed in claim 1, wherein the analysis of at least one reference set of pixels implements motion estimation or filtering of said at least one reference set of pixels.

7. The prediction method as claimed in claim 6, wherein the motion estimation is optical flow motion estimation.

8. The prediction method as claimed in claim 6, wherein the at least one weighting value depends on the result of said motion estimation or of said filtering of said at least one reference set of pixels.

9. The prediction method as claimed in claim 6, wherein when the analysis comprises motion estimation, the at least one weighting value is set to zero for pixels that are undefined in said at least one reference set of pixels, and the at least one weighting value is set to a constant value for pixels that are defined in said at least one reference set of pixels.

10. The prediction method as claimed in claim 6, wherein when the analysis comprises neural filtering, the at least one weighting value is estimated from a plurality of weighting values previously learned by a neural network.

11. A prediction device, comprising:
at least one processor; and
at least one processor-readable medium comprising instructions stored there on which when executed by the at least one processor configures the at least one processor to predict at least one current set of pixels belonging to a current image based on one or more reference set of pixels previously decoded, each reference set of pixels belonging to the current image or to an already decoded reference image, using a pixel prediction weighting function, wherein said pixel prediction weighting function for said at least one current set of pixels comprises at least one weighting value computed based on an analysis of the at least one reference set of pixels.

12. The prediction device as claimed in claim 11, wherein instructions configure the at least one processor to executes a neural network.

13. A non-transitory computer-readable information medium comprising instructions of a computer program stored thereon which when executed by at least one processor of a prediction device configure the prediction device to execute a method comprising:

predicting at least one current set of pixels belonging to a current image based on one or more reference set of pixels previously decoded, each reference set of pixels belonging to the current image or to an already decoded reference image, using a pixel prediction weighting function, wherein said pixel prediction weighting function for said at least one current set of pixels comprises at least one weighting value computed based on an analysis of at least one reference set of pixels.

14. A method implemented by a coding device, comprising:

receiving at least one current set of pixels belonging to a current image;

coding the at least one current set of pixels by:

computing a signal representative of a difference between said at least one current set of pixels and a prediction set of pixels resulting from a prediction of said at least one current set of pixels based on one or more reference set of pixels previously decoded, each reference set of pixels belonging to the current image or to an already decoded reference image, using a pixel prediction weighting function, wherein said pixel prediction weighting function for said at least one current set of pixels comprises at least one weighting value computed based on an analysis of the at least one reference set of pixels, coding said signal, and outputting the signal.

15. The coding method as claimed in claim 14, comprising:

coding at least one modification parameter of the prediction weighting function, wherein the at least one modification parameter is a signal that results from a neuronal filter applied jointly to said at least one current set of pixels and said at least one reference set of pixels, transmitting said at least one coded modification parameter to an image decoder.

16. A device comprising:

at least one a processor; and at least one processor-readable medium comprising instructions stored there on which when executed by the at least one processor configures the at least one processor to code at least one current set of pixels belonging to a current image by:

computing a signal representative of a difference between said at least one current set of pixels and a prediction set of pixels resulting from a prediction of said at least one current set of pixels based on one or more reference set of pixels previously decoded, each reference set of pixels belonging to the current image or to an already decoded reference image, using a pixel prediction weighting function, wherein said pixel prediction weighting function for said at least one current set of pixels comprises at least one weighting value computed based on an analysis of the at least one reference set of pixels, and coding said signal.

17. A decoding method comprising:

decoding at least one current set of pixels belonging to a current image, implemented by a decoding device, the decoding comprising:

receiving a data signal, determining, in the data signal, data representative of a signal representative of a difference between said at least one current set of pixels and a prediction set of pixels resulting from a prediction of said at least one current set of pixels based on one or more reference set of pixels previously decoded, each reference set of pixels belonging to the current image or to an already decoded reference image, using a pixel prediction weighting function, wherein said pixel prediction weighting function for said at least one current set of pixels comprises at least one weighting value computed based on an analysis of the at least one reference set of pixels, and reconstructing said at least one current set of pixels from the determined data and from the prediction set of pixels.

18. The decoding method as claimed in claim 17, furthermore:

determining, in said data signal or another data signal, at least one coded parameter, said parameter being a modification parameter of the prediction weighting function, wherein the modification parameter is a signal that results from a neuronal filter applied jointly to said at least one current set of pixels and said at least one reference set of pixels, decoding said coded modification parameter, and computing a modified prediction weighting function based on the analysis of said at least one reference set of pixels and said at least one decoded modification parameter.

19. A device comprising:

at least one processor;

at least one processor-readable medium comprising instructions stored there on which when executed by the at least one processor configures the at least one processor to decode at least one current set of pixels belonging to a current image by:

receiving a data signal, determining, in the data signal, data representative of a signal representative of a difference between said at least one current set of pixels and a prediction set of pixels resulting from a prediction of said at least one current set of pixels based on one or more reference set of pixels previously decoded, each reference set of pixels belonging to the current image or to an already decoded reference image, using a pixel prediction weighting function, wherein said pixel prediction weighting function for said at least one current set of pixels comprises at least one weighting value computed based on an analysis of the at least one reference set of pixels, and reconstructing said at least one current set of pixels from the determined data and from the prediction set of pixels.

20. A non-transitory computer-readable information medium comprising instructions of a computer program stored thereon which when executed by at least one processor of a decoding device configure the decoding device to execute a decoding method comprising:

decoding at least one current set of pixels belonging to a
current image, the decoding comprising:

receiving a data signal, determining, in the data signal, data representative of a
signal representative of a difference between said at 5
least one current set of pixels and a prediction set of
pixels resulting from a prediction of said at least one
current set of pixels based on one or more reference set
of pixels previously decoded, each reference set of
pixels belonging to the current image or to an already 10
decoded reference image, using a pixel prediction
weighting function, wherein said pixel prediction
weighting function for said at least one current set of
pixels comprises at least one weighting value computed
based on an analysis of the at least one reference set of 15
pixels, and reconstructing said at least one current set of pixels from
the determined data and from the prediction set of
pixels.

* * * * *